(No Model.) 8 Sheets—Sheet 1.
G. W. WATSON.
WEIGHING AND PACKAGE FILLING MACHINE.

No. 556,231. Patented Mar. 10, 1896.

Fig. 1.

Witnesses.
John W. Saxe.
Herman P. Deichert.

Inventor.
George W. Watson
by W. A. Copeland
his atty.

(No Model.) 8 Sheets—Sheet 3.

G. W. WATSON.
WEIGHING AND PACKAGE FILLING MACHINE.

No. 556,231. Patented Mar. 10, 1896.

Fig. 3.

WITNESSES:
John W. Sax
Herman P. Deichert

INVENTOR:
George W. Watson
by W. A. Copeland
his atty (No Model.) 8 Sheets—Sheet 5.

G. W. WATSON.
WEIGHING AND PACKAGE FILLING MACHINE.

No. 556,231. Patented Mar. 10, 1896.

WITNESSES.
John W. Saxe
Herman P. Deichert

INVENTOR.
George W. Watson
by W. A. Copeland
his atty.

(No Model.)

G. W. WATSON.
WEIGHING AND PACKAGE FILLING MACHINE.

No. 556,231. Patented Mar. 10, 1896.

Fig. 21.

Witnesses.
John W. Saxe
Herman P. Deichert

Inventor.
George W. Watson
by W. A. Copeland
his atty.

UNITED STATES PATENT OFFICE.

GEORGE W. WATSON, OF BOSTON, MASSACHUSETTS, ASSIGNOR TO THE ELECTRIC SCALE COMPANY, OF KITTERY, MAINE.

WEIGHING AND PACKAGE-FILLING MACHINE.

SPECIFICATION forming part of Letters Patent No. 556,231, dated March 10, 1896.

Application filed November 1, 1895. Serial No. 567,666. (No model.)

*To all whom it may concern:*

Be it known that I, GEORGE W. WATSON, a citizen of the United States, residing at Boston, in the county of Suffolk and Commonwealth of Massachusetts, have invented a new and useful Improvement in Weighing and Package-Filling Machines, of which the following is a specification, reference being had to the accompanying drawings, which form a part hereof.

This invention relates to that class of weighing and package-filling machines in which the flow of goods into the package is controlled by a gate which is moved automatically to cut off the flow when a package is filled and which is opened again when an empty package is brought into place to receive the goods.

My invention is an improvement on the machine shown in the patent to Doble and Dewson, dated January 8, 1895, No. 532,036, and on the machine shown and described in the application of William H. Doble and George W. Watson, filed March 5, 1895, Serial No. 540,573. In both of those machines the gate is moved by a solenoid.

My invention consists in substituting a piston and cylinder for the solenoid, and piston-valves for the electrical contact devices, and an air-pump for the electric battery.

The machine shown and described herein is similar to the machine shown and described in the application of Doble and Watson above mentioned except with the necessary changes to embody my present invention, and the views and lettering of similar parts correspond as nearly as practicable.

G G' are two piston-cylinders within which respectively the pistons $G^2$ $G^3$ work. The stems $g^5$ $g^6$ of the two pistons are united by a union or are one common stem, on which is a boss $g^7$, from which projects the arm $g^8$, connected with the gate-moving mechanism, as will be described hereinafter. The forward piston $G^2$ is connected with the gate $g$, which controls the outlet of the hopper H by a rod which passes through the cylinder-head, the piston being reciprocated to open and close the gate by means of fluid-pressure admitted alternately to the cylinders from the reservoir through connecting-pipes and valves M and F' at the proper times for feeding and and stopping the flow of goods.

Figure 1:
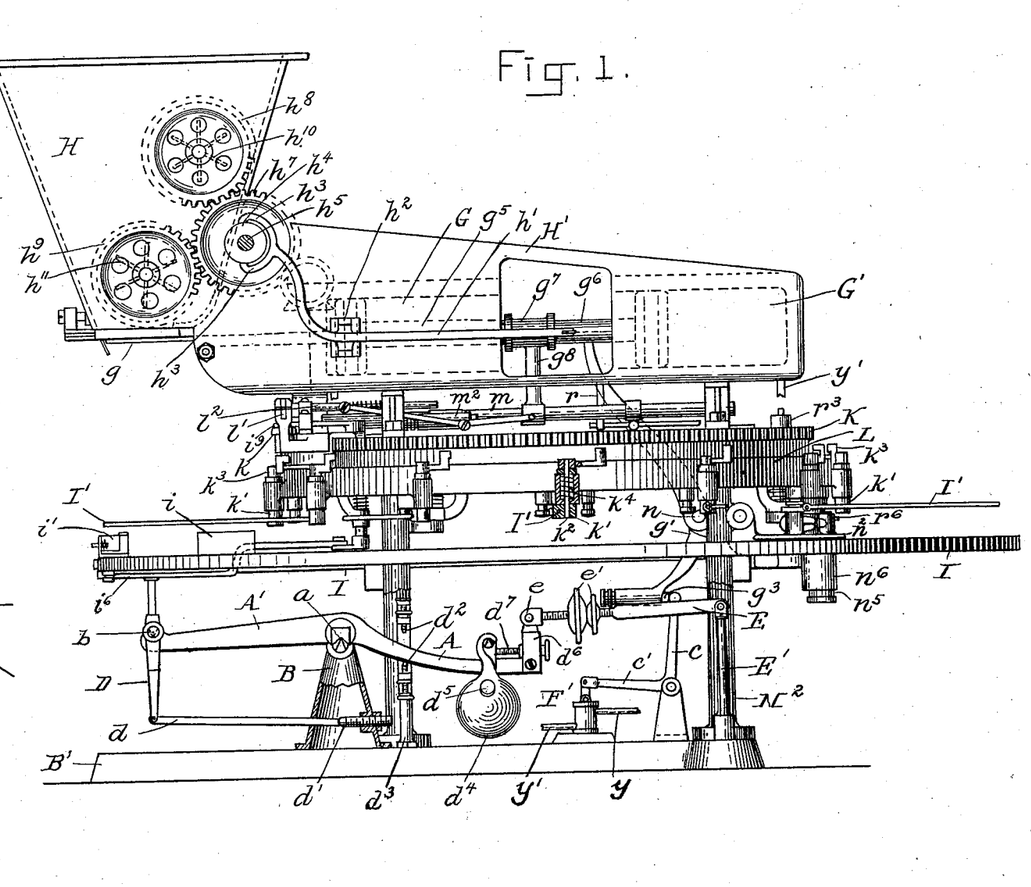
Figure 1 is a side elevation of a machine embodying my invention.
Figure 2:
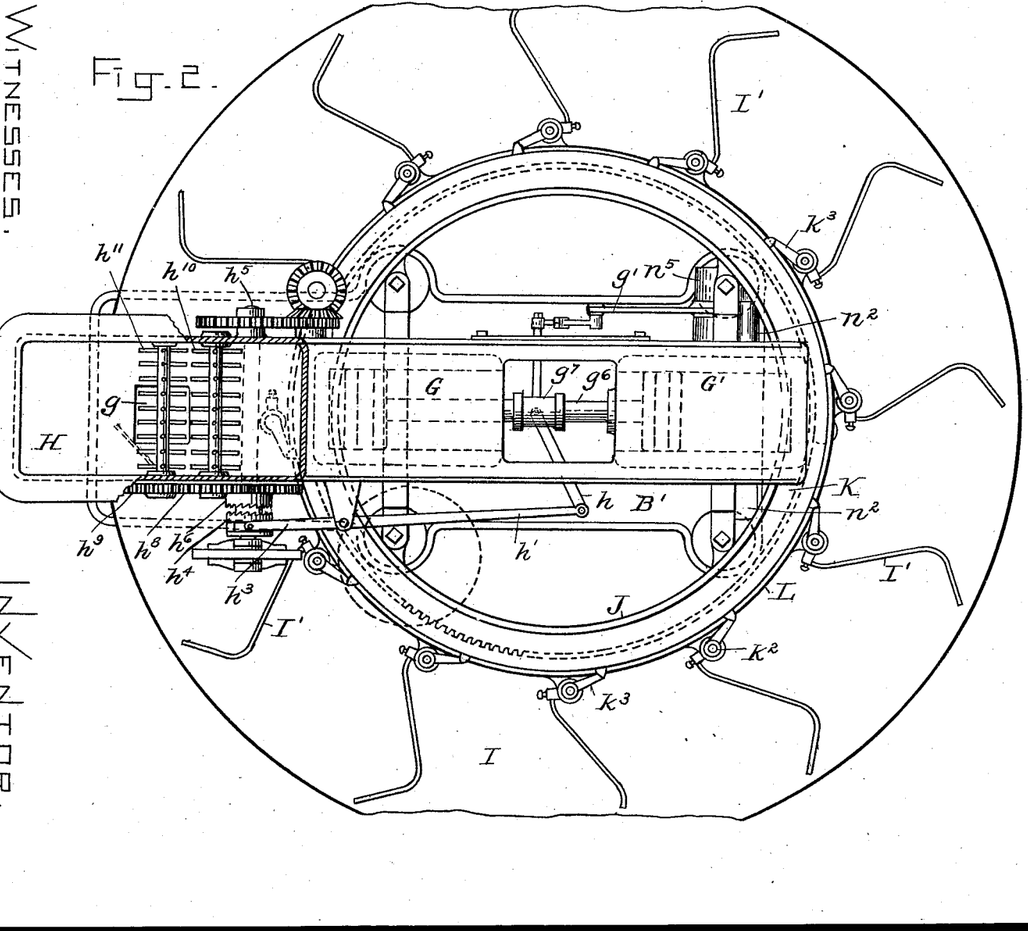
Fig. 2 is a plan.
Figure 3:
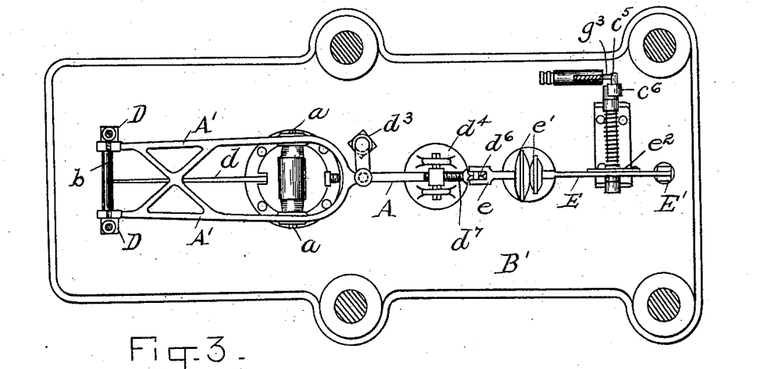
Fig. 3 is a plan of the scales.
Figure 4:
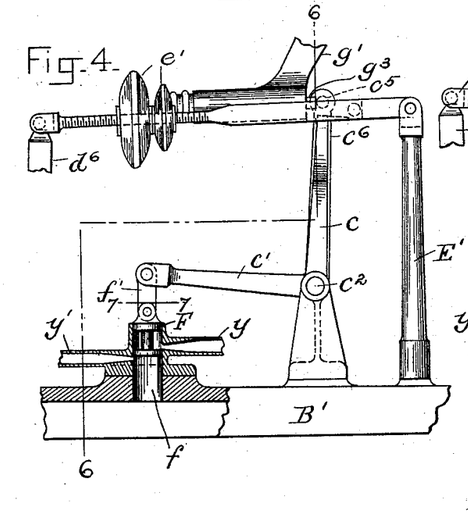
Fig. 4 is a side view of the auxiliary beam and of the gate-closing piston-valve, partly in section, with the valve closed.
Figure 5:
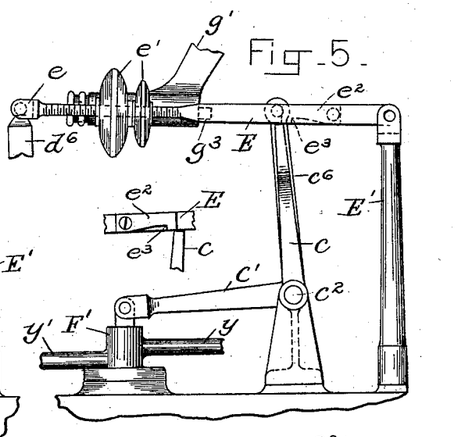
Fig. 5 is a side view of the same parts as Fig. 4 with the valve open.

H' is the frame. A link $h$ is pivoted at one end to the boss $g^7$, and at its other end it is pivoted to the lever $h'$, which is fulcrumed in the bracket $h^2$ attached to the frame. The lever $h'$ has forked ends $h^3$, which have pins sliding in a groove in clutch $h^4$. This clutch is keyed to the driving-shaft $h^5$, upon which it is free to move laterally and is adapted to engage with a clutch $h^6$ on the hub of the pinion-wheel $h^7$, mounted on the main driving-shaft $h^5$. Pinion-wheel $h^7$ engages with the two pinion-wheels $h^8$ $h^9$, which drive the revolving combs $h^{10}$ $h^{11}$, which serve as feeders and break up the lumps. When the gate is closed, as in Figs. 1 and 2, the clutches are disengaged and the combs are not in motion.

I is a stationary circular table on which the cans are placed in front of the hooked fingers I' as fast as the full cans are removed.

J is a fixed inside ring which supports the ring I. The gear-ring K is supported on ball-bearings in the finger-ring L, and is geared to the main driving-shaft and revolves constantly while the power is applied. The ring L, which carries the package-feeding fingers I', is revolved intermittently to bring the empty cans to the scale-pan as fast as the full ones are removed.

For convenience of distinction from the other rings the ring L is called the "finger-ring."

The main scale-beam A is pivoted on the knife-edge pivots $a$ on the post B. On the forward end of the arms A' is pivoted the cross-bar $b$ of the forked frame D, which supports the scale-pan D'. The frame D is hinged at its lower end to the arm $d$, which is pivoted in a slot in the adjustable screw $d'$. The rear arm of the scale-beam A has its up-and-down stroke limited by the adjustable set-screw stops $d^2$. An auxiliary scale-beam E is hinged at the rear end in the upper end of standard E', and the block $e$ on the forward end rests on the block $d^6$ on the rear end of the main scale-beam. The auxiliary beam has on one side a ratchet-piece $e^2$ with which the upper end of angle-bar lever $c$ $c'$ engages. This angle-bar is pivoted on the fixed shaft $c^2$. At the forward end of the horizontal arm $c'$ of the angle-bar is pivoted the link $f'$, connected with the piston F of piston-valve F', which will be referred to as the "gate-closing valve." A pipe $y$ leads from an air pump or reservoir $z$ into the piston-valve cylinder $f$ between the two heads of the piston F, and a pipe $y'$ leads from the piston-valve cylinder $f$ to the piston-cylinder G'. (See Figs. 1, 4, 5, and 21.) A pipe $x$ connects the air-pump with the piston-valve M, which will be hereinafter referred to as the "gate-opening valve," from which a pipe $x'$ leads to the forward piston-cylinder G.

Figures 6, 8:
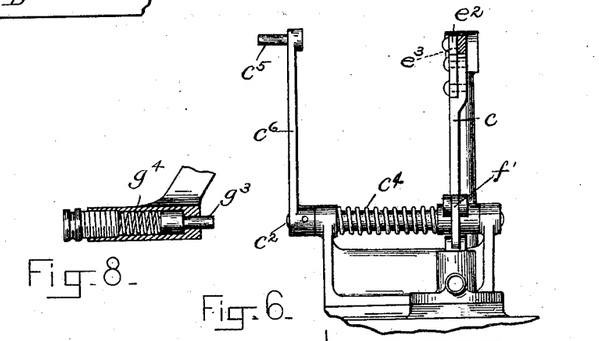
Fig. 6 is an end view, partly in section, on line 6 6 of Fig. 4.
Fig. 8 is a detail section through the spring push-pin.
Figure 7:
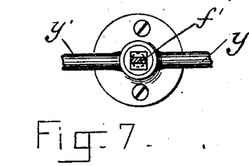
Fig. 7 is a plan view of the piston-valve and connecting-pipes, partly in section, on line 7 7 of Fig. 4.
Figure 9:
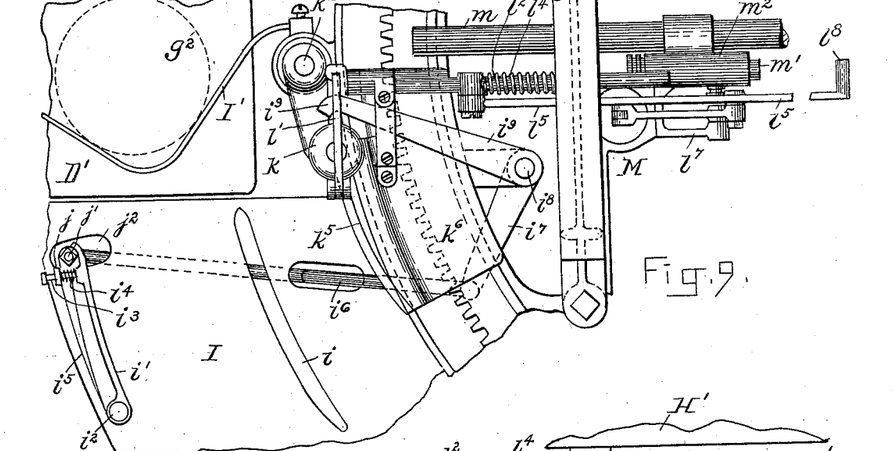
Fig. 9 is a plan view of a portion of the table and scale-pan and rings and adjacent parts in detail, showing their position when a can has just reached the scale and before the gate is opened.
Figure 10:
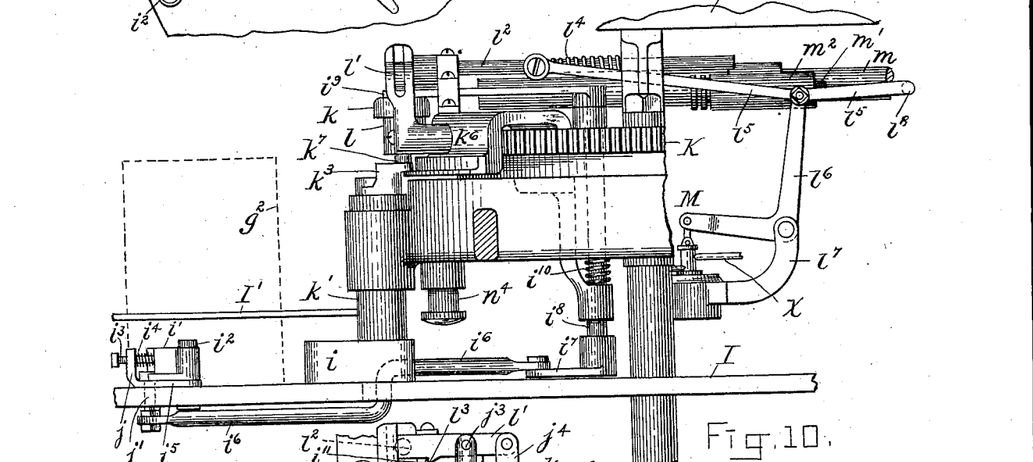
Fig. 10 is a side view of Fig. 9.
Figure 11:
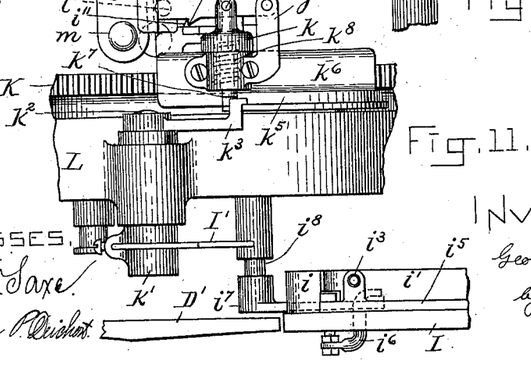
Fig. 11 is an end view of Fig. 9.

When the valve F is open and the valve M is closed, the compressed air will rush into cylinder G' and drive the piston-rod toward the left, and when valve F' is closed and valve M is opened the compressed air in cylinder G' will find vent to the open air through pipe $y'$ and the open end of piston-valve cylinder $f$, while compressed air will rush into piston-cylinder G and drive the piston-rod toward the right. A torsion-spring $c^4$ around shaft $c^2$ (see Fig. 6) tends to keep the piston F down, as in Fig. 5, making an open passage from the air-pump to the cylinder G'. A bent lever $g'$ connected with piston-rod $g^6$ is pivoted at $n$ and carries at its lower end a spring-seated pin $g^2$. When the piston-rod $g^6$ is driven to the left, the bent lever $g'$ is turned on its pivot and the push-pin $g^3$ bears against the stud $c^5$, which projects from the upright arm $c^6$ on the other end of shaft $c^2$ from the arm $c$, thereby rocking shaft $c^2$ and tipping up the angle-bar $c$ $c'$. This lifts the piston F and closes the passage to cylinder G'. The ratchet $e^2$ on the auxiliary beam E will then engage the angle-bar to hold the piston in its elevated position until released by the tipping of the scale-beam. The piston-valve F' is in this closed position, as well as the valve M, when an empty can first reaches the scale-pan, and the gate $g$ is also closed.

Referring now especially to Figs. 9 to 13, $i$ $i'$ are guides between which the empty can is carried just before it reaches the scale-pan. The inner guide, $i$, is fixed to the table, and the outer guide, $i'$, is pivoted at the entrance end on the pivot $i^2$, which also serves as a pivot for the lever $i^3$ immediately beneath the guide $i'$. Fixed to one side of the guide $i'$ near its exit end is a pin $i^3$, which projects through a slot in an ear $j$ upon the lever $i^3$, and around the pin is a spring $i^4$. Normally the exit end is narrower than the entrance, and the can in passing through spreads the outer guide, $i'$, compressing spring $i^4$ and spreading out lever $i^5$. A stud $j'$ on the exit end of lever $i^5$ projects down through a slot $j^2$ in the table I, and to this stud $j'$ is pivoted the bent rod $i^6$, which is pivoted at its other end to lever $i^7$, said lever $i^7$ being fast to shaft $i^8$. To the upper end of this shaft is fixed the arm $i^9$, which in its normal position rests upon the top of cap $k$, in which position it is held by the torsion-spring $i^{10}$ around shaft $i^8$ (see Fig. 10) to prevent cap $k$ from rising. There is a series of package-moving fingers I', each of which is held in a bracket $k'$, which is fast to the lower end of shaft $k^2$, and the cam-lever $k^3$ is fast to the upper end of said shaft. The shaft turns in a boss upon the ring L, and around it is a torsion-spring $k^4$. (Shown in Fig. 1.) This spring is to keep the cam end of lever $k^3$ against the ring L until it reaches the cam-track $k^5$ shortly before the can reaches the scale-pan. This cam-track is a curved flange-piece supported on a bent bracket $k^6$, which arches over the gear-ring K and is fastened to the inner side of the stationary ring J. The lever $k^3$ has a beveled end, which as the finger-ring L revolves comes in contact with the beveled lower end of a stud $k^7$, which projects downward from the under side of cap $k$. The coil-spring $k^8$ around the stud $k^7$ (see Fig. 10) tends to hold the stud down against the cam-track. The stud moves up and down in a boss $l$ fastened to the side of the arched bracket $k^6$ above the cam-track $k^5$. This boss $l$ has an upwardly-extending arm $j^4$, to the end of which is pivoted the arm $l'$, which is also pivoted to the cap $k$.

Figures 12, 14:
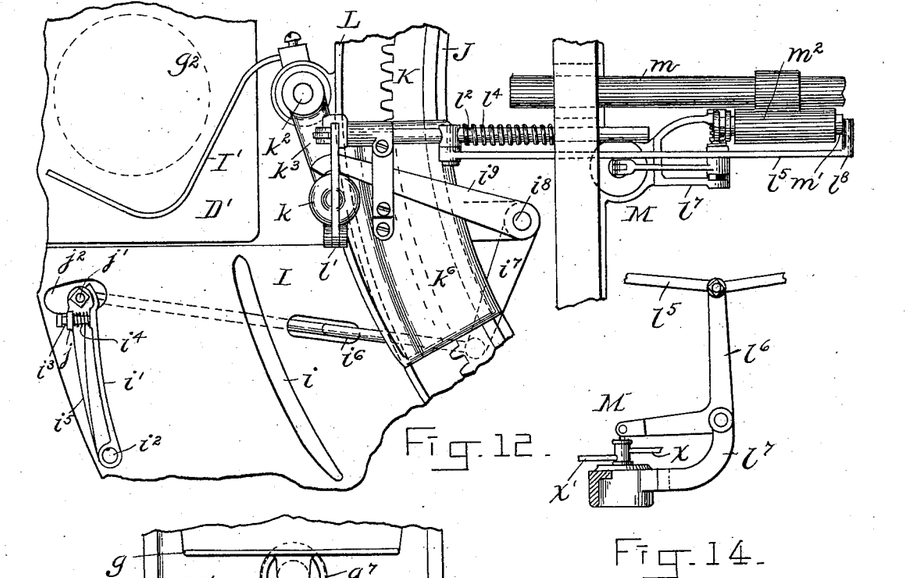
Fig. 12 is a plan view of the parts shown in Fig. 9 immediately after the gate is opened.
Fig. 14 is a side view of the gate-opening piston-valve and lifting-lever when the valve is closed.
Figure 13:
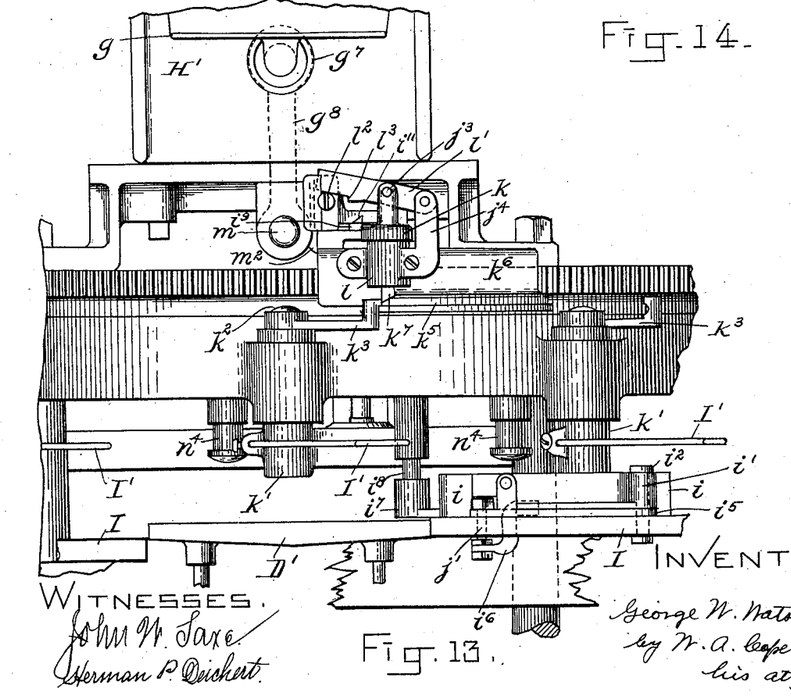
Fig. 13 is an end view of the same.

The tooth-latch $l^3$ on the under side of lever $l'$ engages with tooth $i^{11}$ on the arm $i^9$ at a certain stage in the operation after the arm $i^9$ is removed from the cap $k$ to prevent the spring $i^{10}$ from pulling the arm $i^9$ back against the cap $k$ until the proper time arrives. The lever $l'$ forms a bar to prevent the forward thrust of the sliding rod $l^2$ under pressure of spring $l^4$. Link $l^5$ is pivoted to the side of rod $l^2$, the pivot forming a stop for the spring $l^4$. Link $l^5$ is also pivoted to the upper end of angle-bar lever $i^6$, hinged in the bracket $i^7$. This angle-bar operates the piston-valve M, which has pipes $x\,x'$ leading to the reservoir or air-pump and to the rear or gate-opening cylinder G', as already described. When a can approaches the scales it passes through the guides $i\,i'$ and spreads the outer guide, $i'$, and lever $i^5$, thus pulling rod $i^6$ and lever $i^7$, turning shaft $i^8$ and thereby removing arm $i^9$ from the top of cap $k$, allowing the tooth $i^{11}$ on the upper side of arm $i^9$ to slip past the tooth $l^3$, raising lever $l'$ and stud $k^7$ and cap $k$ slightly, but not sufficiently to allow the rod $l^2$ to be thrust forward. The spring around stud $k^7$ immediately pulls it down again and the two teeth engage with each other and prevent the arm $i^9$ from being pulled back by its spring $i^{10}$. This is the position shown in Figs. 9, 10 and 11. As the can moves forward the cam-lever $k^3$ pushes up the cam-stud $k^7$ and lifts the lever $l'$ from the front of the rod $l^2$, allowing the latter to be thrust forward by the spring $l^4$. At the same time the teeth $i^{11}$ and $l^3$ are released from engagement with each other and arm $i^9$ is drawn part way back; but as the cap $k$ is now raised the arm $i^9$ will bear against the side of the cap, as shown in Figs. 12 and 13, instead of resting on top. As the rod $l^2$ shoots forward it carries link $l^5$, which rocks the angle-bar $l^6$, forward on its pivot, and the piston of gate-opening valve M is pushed down, opening the passage from the supply-pipe $x$ to the cylinder G, admitting the compressed air, which forces out the piston $G^2$ and opens the gate. The can is now on the scale-pan to receive the flow of goods.

The shaft $m$ is rigidly attached to the arm $g^8$, projecting from the boss $g^7$ between the cylinders G G'. The spring-seated push-pin $m'$ is held in a barrel $m^2$ fixed to the side of the shaft $m$. The outward movement of the piston $G^2$ to open the gate carries back also the sliding shaft $m$, and the pin $m'$ pushes against stud $l^8$ on the end of link $l^5$, tipping up the angle-bar $l^6$ and lifting the piston of valve M and closing the passage from tube $x$ to tube $x'$ and allowing cylinder G to vent into the outside air through the tube $x'$ and open end of the piston-valve cylinder M. This balances the pressure on piston $G^2$ and both piston-valves M and F' are closed. The backward movement of shaft $m$ also draws back the rod $l^2$ from under the lever $l'$, compressing spring $l^4$ again and allowing the spring $k^8$ to pull the cap $k$ and its stud $k^7$ and the arm $l'$ down to their normal positions. As soon as cap $k$ descends, arm $i^9$ will be drawn back by its spring $i^{10}$ to its position of rest on top of cap $k$.

As soon as the can is filled and the scale-beam tips, the auxiliary scale-beam is also lifted, raising its ratchet from engagement with the arm $c$ of the angle-bar $c\,c'$, allowing the angle-bar to respond to its torsion-spring and rock forward, depressing the piston F, and connection is made between the reservoir or air-pump and gate-closing cylinder G'. Piston $G^3$ is pushed out and the gate is closed. The movement of the piston turns the lever $g'$ on its pivot, which causes angle-bar $c\,c'$ to rock back and lift piston F and shut off the connection between the reservoir and the cylinder G'. The compressed air in cylinder G' vents into the outside air through the open tube $y'$ and cylinder $f$, equalizing the pressure on piston G', leaving both valves F' and M closed, as in Fig. 21 and as stated at the beginning of the operation.

The finger-ring L has a series of spring-seated pins $n^4$, one corresponding to each of the fingers I' and adapted to engage in holes in the gear-ring K to lock the two rings together when the gate closes. The mechanism is particularly shown in Figs. 15 to 20.

While the package is being filled, the rings K and L are not locked together, because the package-moving ring must remain at rest and the gear-ring is in constant motion.

Figure 15:
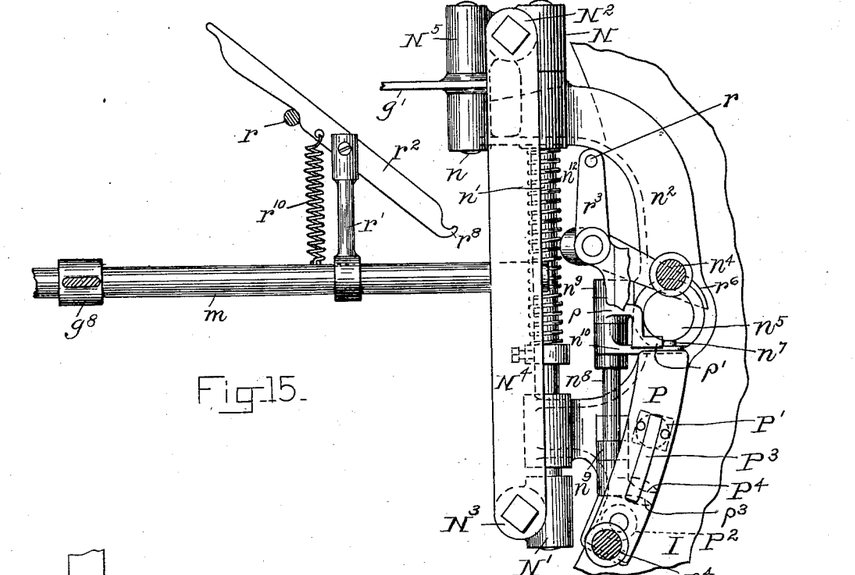
Fig. 15 is a plan view of a part of the machine, showing the locking mechanism for locking the package-carrying ring to the revolving gear when the package-ring is locked to the gear-ring.
Figure 16:
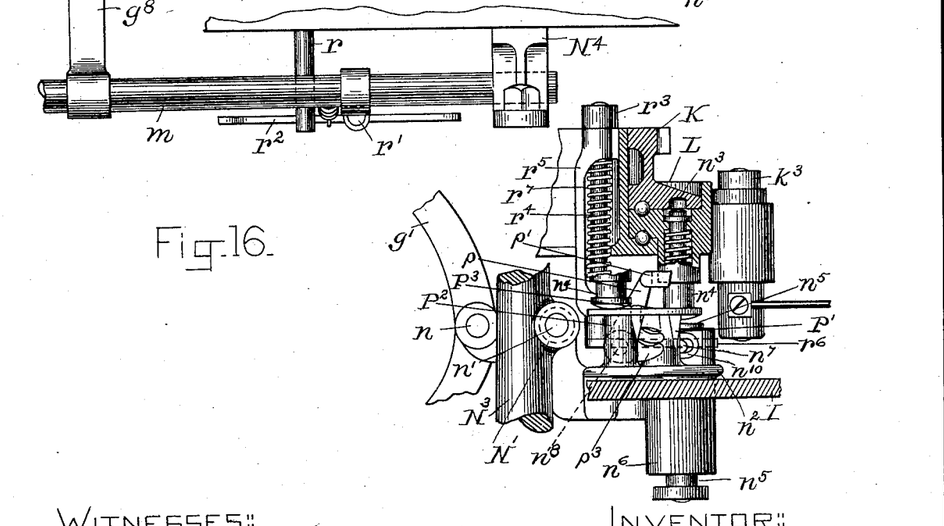
Fig. 16 is a side view of the locking mechanism and section through the ring and gear, showing one of the locking-pins unlocked. The rings are supposed to be locked, however, by the other pin, which is partly broken away.
Figures 17, 18, 19, 20:
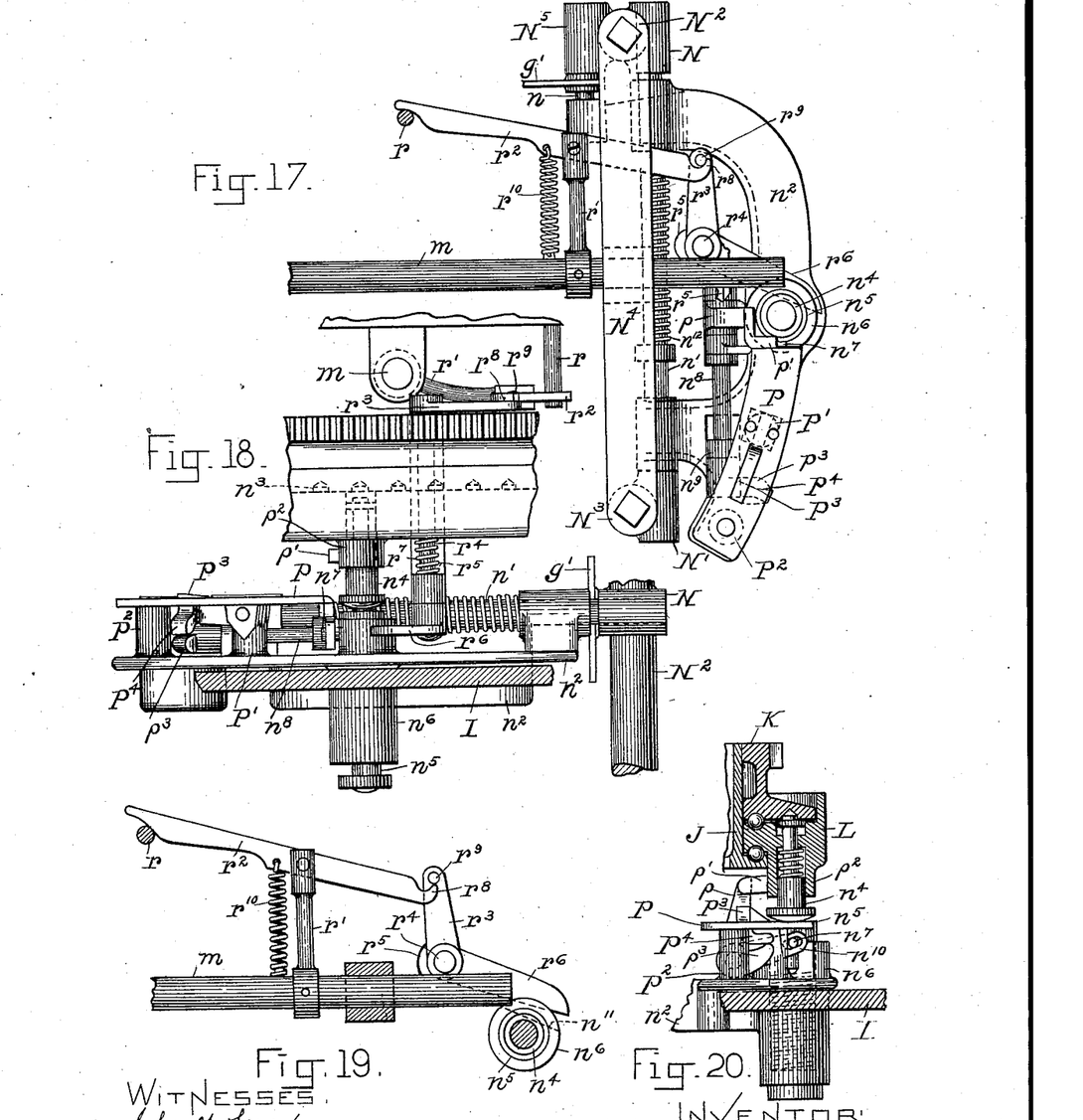
Fig. 17 is a plan view of the parts shown in Fig. 15 when the rings are unlocked.
Fig. 18 is an end view.
Fig. 19 is a detail plan of the hooked lever freeing the spring-plug connected with the locking mechanism just after a can is filled.
Fig. 20 is a side view of the mechanism, partly in section, with the rings locked.
Figure 21:
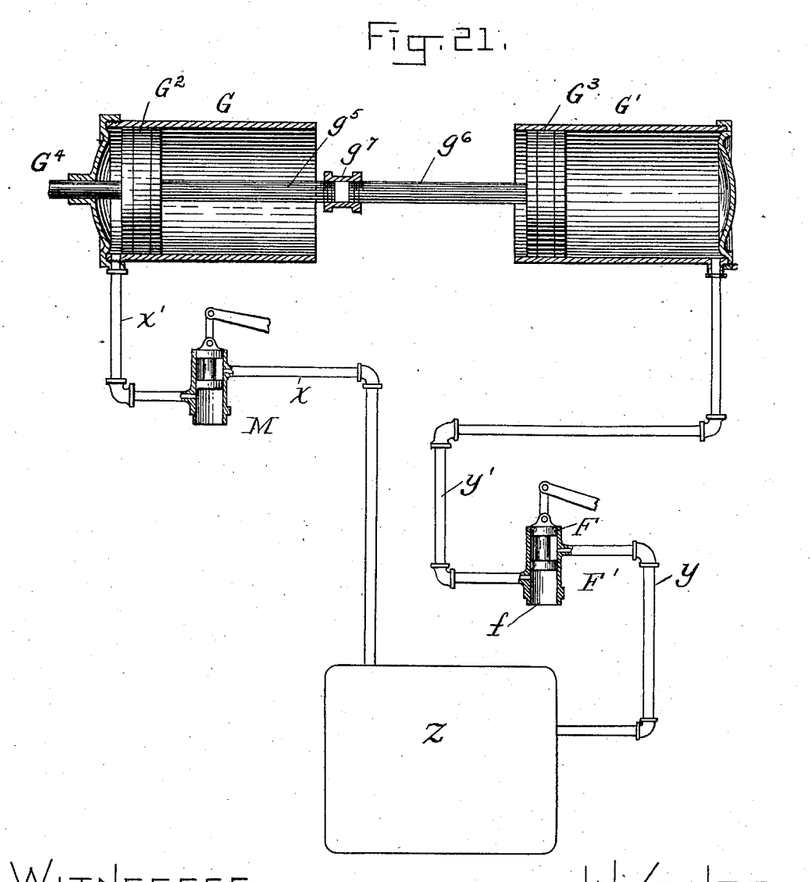
Fig. 21 is a diagram showing the piston cylinders and valves and pipe connections.

In Figs. 15, 16, and 20 the rings are supposed to be locked together, being locked in Fig. 16 by the left-hand one of the pins $n^4$, which is partly broken away to clearly show the parts behind it, and the package-moving ring has nearly completed its forward movement with a can approaching the scale-pan. When one of the bosses $p^2$, holding a spring-pin $n^4$, arrives against the hooked lever $p\,p'$, the gate will have opened, drawing back shaft $m$ and hooked cam-lever $r^2$ from the position shown in Fig. 15 to the position shown in Fig. 17, with the hook $r^3$ engaging stud $r^9$ on the lever $r^3$. These parts remain stationary while the can is being filled. As soon as the can is filled and the scale-beam drops and the gate begins to close, shaft $m$ moves forward and the hooked cam-lever $r^2$ pulls the levers $r^3$ and $r^6$ away from the spring-plug $n^5$ into the position shown in Figs. 19 and 20, allowing the spring-plug $n^5$ to rise and throw the spring pin $n^4$ into one of the holes in gear-ring $k$, and the two rings move together until the spring-pin $n^4$ leaves the plate P, at which time a can is on the scale and the next following spring-pin has reached the hooked stop-lever $p\,p'$, which stops the motion of the package-moving or finger ring. When the spring-plug $n^5$ moves upward, it moves the stop-lever $p\,p'$ back from the spring-pin $n^4$ and leaves the spring-pin free to move forward on plate P.

It is obvious that with slight changes a vacuum-pump may be used in place of compressed air, and other fluid-pressure may be employed without departing from the spirit of my invention, and I claim as a part of my invention the employment of a vacuum-pump or any fluid-pressure as a substitute for the compressed air herein mentioned. It is also obvious that a single cylinder with closed ends and a single piston may be substituted for the two cylinders G G' and pistons G² G³. In such case the pipes connecting it with the piston-valves F' and M, respectively, should lead into the large cylinder on opposite sides of the piston.

What I claim as my invention is—

1. In a weighing and package-filling machine, the combination of a feed-hopper, a weighing-scale, a gate which controls the flow of goods from the hopper, a piston and cylinder whose piston is connected with the gate, a reservoir supply of fluid-pressure, pipes leading from the reservoir into said cylinder at opposite sides of the piston, gate-opening and gate-closing valves in said pipes, and mechanism connected with the scales whereby when a can is brought to the scale-pan the gate-opening valve is opened, admitting pressure to the gate-moving piston-cylinder whereby its piston is reciprocated to open the gate, and mechanism whereby when the scale-beam tips the gate-opening valve is closed and the gate-closing valve is opened admitting pressure to the gate-sliding cylinder on the opposite side of the piston whereby the piston is reciprocated to close the gate, substantially as described.

2. In a weighing and package-filling machine, the combination of a feed-hopper, a weighing-scale, a gate which controls the flow of goods from the hopper, a piston and cylinder whose piston is connected with the gate, a reservoir supply of fluid-pressure, pipes leading from the reservoir into said cylinder at opposite sides of the piston, gate-opening and gate-closing valves in said pipes, and mechanism connected with the scales whereby when a can is brought to the scales the gate-opening valve is opened admitting pressure to that portion of the piston-cylinder whereby its piston is reciprocated to open the gate, mechanism which again closes said valve and opens a vent from the cylinder to the outer air whereby the pressure on the piston is equalized before the gate-closing valve is opened, mechanism which opens the gate-closing valve when the package contains the predetermined weight admitting pressure to that portion of the cylinder whereby its piston is reciprocated to close the gate, and mechanism which closes said gate-closing valve and opens a vent from the cylinder to the outer air whereby the pressure on the piston is equalized before the gate-opening valve is again opened, substantially as described.

3. In a weighing and package-filling machine, the combination of a feed-hopper, a weighing-scale, a gate which controls the flow of goods from the hopper, a piston and cylinder whose piston is connected with the gate, an air-pump, pipes leading from the air-pump into said cylinder at opposite sides of the piston, gate-opening and gate-closing valves in said pipes, and mechanism connected with the scales whereby when a can is brought to the scale-pan the gate-opening valve is opened, opening the passage from the air-pump to one portion of the gate-moving piston-cylinder by which its piston is reciprocated to open the gate, and mechanism whereby when the package contains the required weight the gate-opening valve is closed and the gate-closing valve is opened making a clear passage from the air-pump to the other portion of the gate-moving piston-cylinder whereby its piston is reciprocated to close the gate, substantially as described.

4. In a weighing and package-filling machine, the combination of a feed-hopper, a weighing-scale, a gate which controls the flow of goods from the hopper, a double piston and cylinder whose pistons are connected with each other and with the gate, an air-pump, a pipe-line from the air-pump to each of said cylinders, a piston-valve in each pipe-line, and mechanism connected with the scales by which when a can is brought to the scale-pan the gate-opening valve is opened making the passage open from the air-pump to one of the cylinders whereby its piston is reciprocated to open the gate, mechanism which again closes said valve and opens a vent from said cylinder to the outer air so that the pressure on the piston is equalized before the gate-closing valve is opened, mechanism which opens the gate-closing valve when the package contains the predetermined weight of goods, making the passage open from the air-pump to the other piston-cylinder, whereby its piston is reciprocated to close the gate, and mechanism which closes said gate-closing valve and opens a vent from the last-mentioned piston-cylinder to the outer air so that the pressure on its piston is equalized before the gate-opening valve is again opened, substantially as described.

5. In a weighing and package-filling machine, the combination of a feed-hopper, a weighing-scale, a gate which controls the flow of goods from the hopper, a piston and cylinder whose piston is connected with the gate, an air-pump, a pipe-line leading from said air-pump into said cylinder at opposite sides of the piston, a gate-opening valve in one of the pipe-lines and a gate-closing valve in the other pipe-line, an automatic intermittently-moving package-carrier, mechanism actuated by the package-carrier as it moves to the scales which opens the valve in the gate-opening line admitting pressure to the piston-cylinder and causing the piston to reciprocate in a direction to open the gate, intermediate mechanism operated by the reciprocating piston which closes the valve in the gate-opening line again and equalizes the pressure on the piston before the valve in the gate-closing line is opened, mechanism operated by the tipping of the scales when the package is filled which opens the valve in the gate-closing line, admitting pressure to the piston-cylinder and causing the piston to reciprocate in the reverse direction and close the gate, and mechanism operated by the said piston to again close the gate-closing valve and equalize the pressure on the piston, substantially as described.

6. In a weighing and package-filling machine, the combination of a feed-hopper, a weighing-scale, a gate which controls the flow of goods from the hopper, a double piston and cylinder whose pistons are connected with each other and with the gate, an air-pump, a pipe-line from the air-pump to each of said cylinders, a gate-opening piston-valve in one pipe-line, and a gate-closing piston-valve in the other line, an automatic intermittently-moving package-carrier, mechanism actuated by the package-carrier as it moves to the scales which opens the valve in the gate-opening line making the passage open from the air-pump to one of the cylinders whereby its piston is reciprocated to open the gate, mechanism operated by the reciprocating piston which closes the valve in the gate-opening line and opens a vent from said cylinder to the outer air whereby the pressure on the piston is equalized before the gate-closing valve is opened, mechanism operated by the tipping of the scales when the package is filled which opens the valve in the gate-closing line, making the passage open from the air-pump to the other piston-cylinder whereby its piston is reciprocated in a direction to close the gate, and mechanism operated by said piston to again close the gate-closing valve and open a vent from the last-mentioned piston-cylinder to the outer air whereby the pressure on its piston is equalized before the gate-opening valve is again opened, substantially as described.

GEORGE W. WATSON.

Witnesses:
WILLIAM A. COPELAND,
THOMAS H. SEELY.